United States Patent
Nitecki

(10) Patent No.: US 7,779,697 B2
(45) Date of Patent: Aug. 24, 2010

(54) PRESSURE SENSING DEVICE ADAPTED TO CORROSIVE OR EXPLOSIVE ATMOSPHERES

(75) Inventor: Jean-Pierre Nitecki, Buc (FR)

(73) Assignee: Tokheim Holding BV, Ad Bladel (NL)

( * ) Notice: Subject to any disclaimer, the term of this patent is extended or adjusted under 35 U.S.C. 154(b) by 97 days.

(21) Appl. No.: 12/354,822

(22) Filed: Jan. 16, 2009

(65) Prior Publication Data

US 2009/0249881 A1 Oct. 8, 2009

(30) Foreign Application Priority Data

Jan. 24, 2008 (FR) ................... 08 50450

(51) Int. Cl.
*G01L 7/00* (2006.01)
(52) U.S. Cl. ....................................... 73/706
(58) Field of Classification Search ............. None
See application file for complete search history.

(56) References Cited

U.S. PATENT DOCUMENTS

| | | | | |
|---|---|---|---|---|
| 3,559,488 A | | 2/1971 | Weaver | |
| 4,733,563 A | * | 3/1988 | Nava et al. | 73/706 |
| 5,094,109 A | * | 3/1992 | Dean et al. | 73/718 |
| 5,614,659 A | * | 3/1997 | Rickman | 73/35.16 |
| 6,715,360 B1 | * | 4/2004 | Pepperling et al. | 73/756 |
| 7,150,194 B2 | * | 12/2006 | Pepperling et al. | 73/706 |

FOREIGN PATENT DOCUMENTS

FR    0269384 A1    6/1988

* cited by examiner

*Primary Examiner*—Andre J Allen
(74) *Attorney, Agent, or Firm*—Drinker Biddle & Reath LLP

(57) ABSTRACT

A pressure sensing device particularly intended to equip a flowmeter of fluidic oscillator type, this device comprising a pressure orifice (3) linked to a measuring circuit (4) so as to send audible signals to a measuring membrane (1) fixed into a measuring cavity (2), a deformation sensor (5) sensitive to the deformations of this membrane and capable of converting them into electric signals, and an electronic amplifier associated with this deformation sensor (5), characterized in that the measuring circuit (4) comprises corrosion- and explosion-proof protection means (7, 8, 9) and filtering means (9, 10; 11, 12; 13, 2) for filtering the audible signals so as to enable the disturbance frequencies of these signals to be removed.

7 Claims, 2 Drawing Sheets

Figure 2:
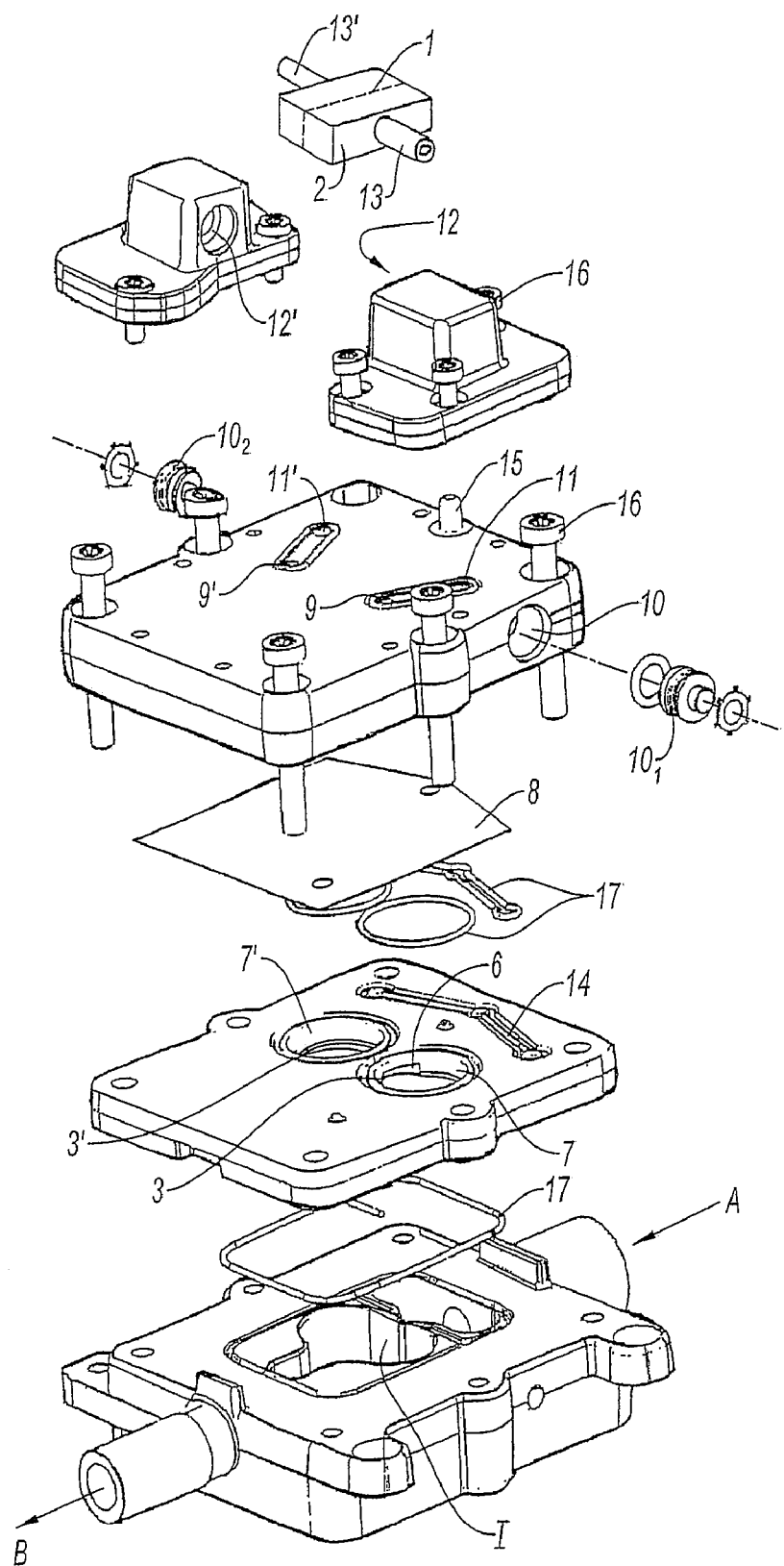

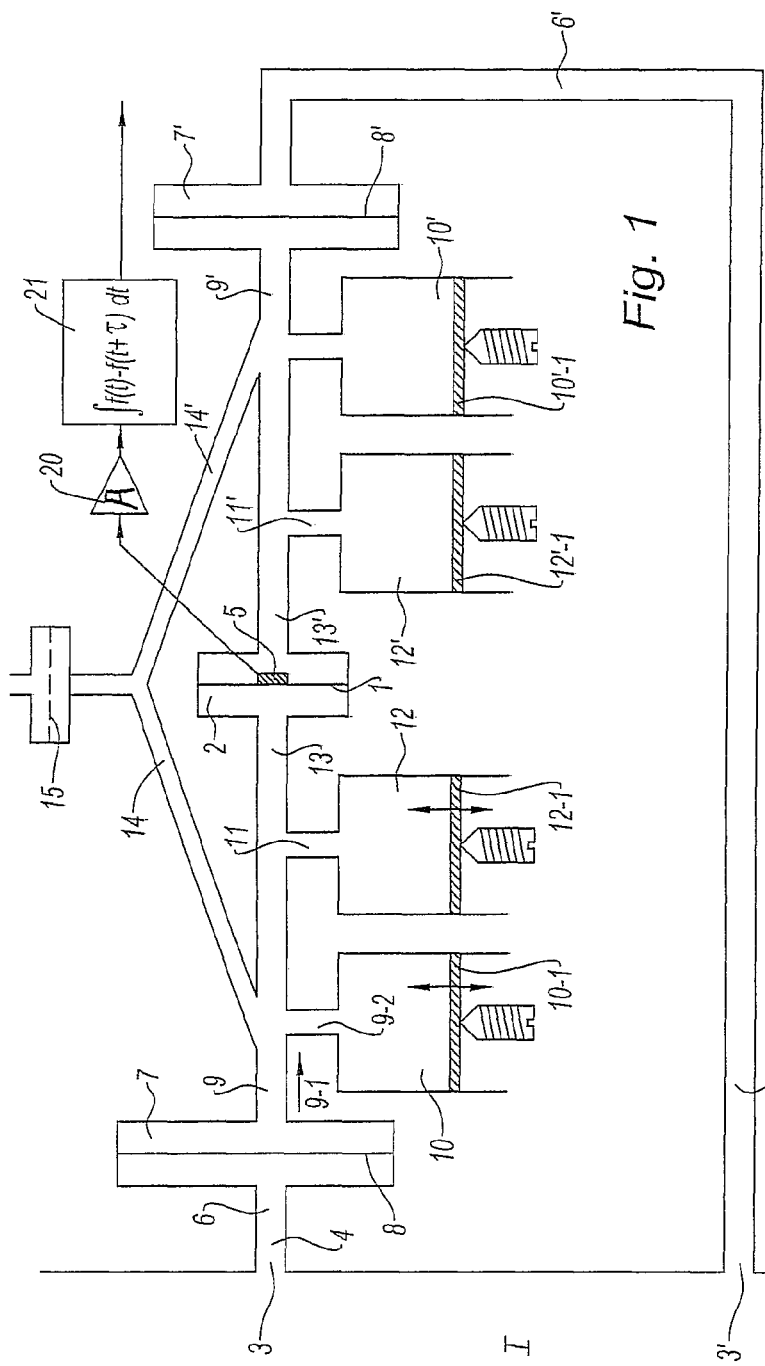
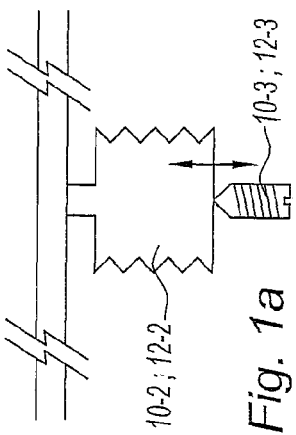
Fig. 1
Fig. 1a

PRESSURE SENSING DEVICE ADAPTED TO CORROSIVE OR EXPLOSIVE ATMOSPHERES

The object of the present invention is to provide a pressure sensing device adapted to corrosive or explosive atmospheres.

Such a device is more particularly intended to equip a vapor or liquid flowmeter of fluidic oscillator type but may also be used for other types of pressure sensors, including sound pressure sensors such as in microphones.

A static fluidic oscillator of the type considered within the scope of the present invention is described in document FR 2 746 147 A as an example.

In such a flowmeter, the fluid to be measured passes through an enclosure in which it becomes turbulent and generates periodic pressure oscillations the frequency of which is proportional to the flow of this fluid.

These pressure oscillations are broadly similar to the phenomena occurring in a musical instrument, in particular a wind instrument.

Indeed, in such an instrument, under the effect of his breath, the player generates audible signals representative of the pressure and flow variations.

These signals, the frequency of which is audible and of high amplitude, have a complex shape resulting from the addition of a fundamental clean frequency and many harmonics.

They can be adjusted automatically by the player thanks to his hearing by controlling the flow and the pressure of his breath so as to obtain the desired audio frequencies.

A flowmeter of static fluidic oscillator type is designed to obtain, in the enclosure, periodic pressure oscillations the frequency of which is proportional, as precisely as possible, to the flow of fluid passing through it over a wide range of frequencies.

Consequently, the measurement and use of signals representative of these periodic pressure variations enable the flow of the fluid passing through the oscillator to be determined.

To measure such a flow, the possibility of equipping the fluidic oscillator with heated temperature probes has already been suggested.

Indeed, the fluid passing through the oscillator cools down these temperature probes in proportion to its speed, and consequently, the measurement of the temperature enables the flow searched for to be determined.

However, such a measurement is only possible in the event of liquids and not gases as the thermal variations are then too low.

To remedy this disadvantage and to enable both flows of liquids and gases to be measured, the possibility of equipping the fluidic oscillators with pressure sensors has already been suggested, and in particular with differential pressure sensors located on either side of their inlet.

Such pressure sensing devices classically comprise:
- a pressure orifice linked to a measuring circuit so as to send audible signals representative of the variations in the pressure to be measured to a measuring membrane, particularly a metal membrane fixed into a measuring cavity and deforming under the effect of the audible signals thus applied thereto,
- a deformation sensor sensitive to these mechanical deformations and capable of converting them into electric signals, and
- electronic processing units for electronically processing the electric signals, particularly an electronic amplifier, associated with this deformation sensor.

In such a pressure sensing device, one of the sides of the measuring membrane is free of any element likely to be disturbed by the fluids that come up to its level; however, the second side of this membrane is equipped with electrical components crossed by electric currents and thus not compatible with any contact with explosive or chemically aggressive products.

A pressure sensing device of this type can therefore be used as a relative pressure sensor to measure the pressure exerted on the side of the measuring membrane free of any dangerous element; however, it cannot be used as a differential pressure sensor as one of the two sides of the measuring membrane is crossed by electric currents likely to generate corrosion phenomena and above all explosions.

To overcome this difficulty, the possibility of mounting two identical pressure sensors back-to-back has already been suggested so that the two measuring membranes are opposite and only their surface free of any electrical components is in contact with the fluids to be measured.

However, in such a mounting, one comes up against difficulties in balancing the two pressure measurements and major difficulties in obtaining a stable zero and a symmetrical signal.

Moreover, in the presence of explosive or chemically aggressive fluids, such a system becomes very complicated and thus costly and voluminous.

The object of the present invention is to remedy these disadvantages by proposing a pressure sensing device of the above-mentioned type which can be used as a differential pressure sensor by enabling the balance and zero stability problems to be solved.

According to the present invention, such a device must further be sufficiently sensitive to enable pressure variations in the order of one mbar to be detected, while being small in volume and having a very competitive price compared to traditional sensors.

For this purpose, the present invention relates to a pressure sensing device adapted to corrosive or explosive atmospheres characterized in that the measuring circuit comprises:
- firstly, corrosion- and explosion-proof protection means comprising
    - a very thin corrosion-proof protective membrane which is slightly elastically deformable, made of a very resistant material and blocked in a protective cavity dimensioned in such a way as to limit its displacement, and
    - at least one explosion-proof protective tube mounted downstream from the protective membrane in the direction in which the electric signals propagate, designed so as to avoid any flame propagation and used as a hydraulic resistance, and
- secondly, filtering means for filtering the audible signals comprising at least one Helmholtz-type resonator consisting of the association of a by-pass of the protective tube and of a cavity used as a resonating chamber and dimensioned in such a way as to enable the disturbance frequencies to be removed from the audible signals before they are applied to the measuring membrane.

According to the present invention, the protective membrane which can advantageously be made of Kapton®, stainless steel or phosphor bronze, generally has an extremely low thickness in the order of 0.01 mm for a diameter in the order of 20 mm so as to be capable of resending the audible signals representative of the variations in the pressure taken at the pressure orifice without any substantial attenuation.

So as to protect this membrane against any risk of tearing in the presence of very high pressure variations which may be generated accidentally in the measuring circuit and in particular in the duct located directly downstream from the pressure orifice in the direction in which the audible signals propagate, this membrane is mounted inside a narrow protective cavity, generally of cylindrical shape and in which it is blocked.

The presence of this protective cavity enables the deformations of the protective membrane to be limited to a maximum displacement in the order of 1 mm.

Indeed, given its slightly elastically deformable nature, in the presence of an excessively high overpressure, the latter is flattened against the walls of the protective cavity, thus preventing it from being subjected to deformations capable of damaging its elastic and mechanical properties.

If required, seals can be provided to guarantee that the membrane is perfectly tight.

However, in normal operation, the protective membrane oscillates in the protective cavity without coming into contact with the walls of this cavity; consequently, the audible signals taken at the pressure orifice are integrally sent without any substantial attenuation, in the part of the measuring circuit located downstream from the protective membrane in the direction in which these signals propagate.

It shall be noted that to avoid any attenuation or disturbance of these audible signals, the duct linking the pressure orifice to the protective cavity must have a small diameter and a short length.

According to the present invention, the explosion-proof protective tube preferably has a section in the order of 0.3 mm² for a length of 7 mm; it is designed to form an explosion-proof barrier and to serve as a flame arrester insofar as, in the event of an explosion, it enables the gas jet to be laminated and expansion cooled, thus preventing flames from spreading to the electrical components of the sensor.

The construction details and in particular the design of the corrosion- and explosion-proof protection means comply with the European standard EN 12 874 specifying the "flame arrester operating limits and performance requirements".

According to the present invention, the presence of filtering means is essential to send the deformation sensor accurate "clean" audible signals that can subsequently be used with ease given that in a fluidic oscillator the pressure variations are generally of a very low amplitude, in the order of approximately 1 mbar, and that as in a musical instrument, the signals taken at the pressure orifice and transferred into the measuring circuit are signals with a complex shape resulting from the addition of a fundamental clean frequency with many harmonics corresponding to disturbance frequencies that must be removed by filtering as fully as possible before they are applied to the measuring membrane.

Consequently, the presence of at least one Helmholtz-type resonator corresponds to one of the essential elements of the pressure sensing device conforming to the present invention.

Such a resonator is well-known by specialists and corresponds from an electronic point of view to a low-pass RC filter.

It enables a particularly efficient filtering of the audible signals sent thereto to be obtained insofar as it performs a high amplification of certain sensitive frequencies, in particular of a lower frequency referred to as the natural resonant frequency of the resonator which is the most reinforced.

It will be understood that the dimensions of the cavity used as a resonating chamber the volume of which is generally of a few mm³ are defined according to the nature of the frequencies to be filtered.

It shall be noted that, in accordance with the document U.S. Pat. No. 3,559,488, a pressure sensing device adapted to corrosive atmospheres had already been proposed, comprising:
 a pressure orifice linked to a measuring circuit so as to send audible signals representative of the variations in the pressure to be measured to a measuring membrane fixed into a measuring cavity and deforming under the effect of the audible signals applied thereto,
 a deformation sensor sensitive to these mechanical deformations and capable of converting them into electronic signals, and
 an electronic amplifier associated with this deformation sensor.

However this device is not equipped with either explosion-proof protective means or filtering means for filtering the audible signals capable of enabling the disturbance frequencies to be removed from these signals before they are applied to the measuring membrane.

According to a particularly advantageous feature of the present invention, the means for filtering the audible signals comprise at least two Helmholtz-type resonators mounted successively on the measuring circuit and designed so as to have different natural resonant frequencies.

Adding this second Helmholtz-type resonator in series constitutes a secondary filter enabling only the fundamental frequency of the audible signals taken at input of the measuring cavity to be allowed to pass and the disturbance frequencies to be largely removed.

It shall be noted that the geometry and the dimensions of the rigid cavities and of the tubes of the Helmholtz-type resonators must be appropriately adjusted according to the nature of the fluid to be measured (liquid or gas).

In the event of incompressible fluids, the cavities must be elastically deformable and advantageously consist of bellows that are elastic by construction.

According to another feature of the present invention, the measuring cavity is linked to the Helmholtz-type resonator or to one of them, i.e. the resonator mounted downstream in the direction in which the audible signals propagate, by a measuring channel so as to define with this cavity an additional Helmholtz-type resonator.

The device conforming to the present invention thus enables at least three filtering stages to be obtained at three different natural resonant frequencies the accumulation of which constitutes a third order filter that ensures that only a range of fundamental frequencies of the audible signals is transferred towards the measuring membrane after all the disturbance frequencies have been removed.

Such a filtering thus enables frequency variations lower than one mbar to be detected.

According to another feature of the present invention, the natural frequencies of the three Helmholtz-type resonators are adjusted so that their combination gives a bandwidth for all the wanted signals generated by the cavity of the fluidic oscillator.

The volume included between the two membranes, if any, may be filled with a highly viscous liquid (oil) enabling the vibratory phenomena to be absorbed.

It shall be noted that the number of filtering stages can be either increased or decreased depending on the processing to be carried out.

It shall also be noted that the device conforming to the present invention can be considered tantamount to the structure of the human ear in which the audible signals are received in the pinna that is closed by a protective membrane (the tympanum) that is itself associated, in the internal ear, with the auditory ossicles, and with the labyrinth that corresponds to a tube filled with liquid containing a membrane in its central part which can be considered tantamount to the acoustic filter of the device conforming to the present invention.

The propagation of the acoustic vibrations in this tube is detected by pressure sensors spread along the latter and consisting of filaments of different lengths that resound at different frequencies so as to activate the acoustic nerve.

According to another feature of the present invention, the measuring membrane consists of an elastically deformable membrane, preferably made of silicon, on one face of which electrical resistances are etched, particularly wheatstone-bridge mounted, at least one of which is sensitive to the deformations of the membrane.

When crossed by a current, these resistances that constitute the deformation sensor enable electric signals to be obtained that are representative of the audible signals sent to the measuring membrane after upstream filtering of the disturbance frequencies.

After amplification, these electric signals constitute measuring signals that are particularly clean and accurate and which can easily be processed by a microprocessor.

According to another feature of the present invention, the measuring cavity is linked to the external environment by an outlet channel of low section.

The addition of such a channel can prove necessary insofar as, in the device conforming to the present invention, the space between the protective membrane and the measuring membrane forms a sealed closed volume.

Indeed, during the manufacturing and assembly of the device, an overpressure compared to the external atmospheric pressure can be introduced into this closed volume.

Now, such an overpressure causes the measurement zero to shift.

The presence of the outlet channel enables this disadvantage to be remedied by creating a permanent leakage between this closed volume and the atmosphere, thus by removing this overpressure.

This outlet channel can advantageously have a very low section, in the order of 0.1 mm² for a significant length of several centimeters so as to enable this overpressure to be evacuated with a long time constant compared to the maximum time constant linked to the frequency of the signal to be measured.

However, the presence of this outlet channel is likely to cause atmospheric water vapor to penetrate into the measuring cavity, which must be avoided.

To do so, it is advantageous, in accordance with the present invention, to equip the outlet channel, particularly at its vent orifice, with a selective porous membrane, particularly a PIFE-based membrane, having the property of allowing air to pass while preventing water molecules from passing.

This type of membrane is currently used in medical applications.

It shall be noted that the device described above can prove satisfactory in the event of pressure sensors intended to measure a relative pressure variation compared to the external atmospheric pressure prevailing on one side of the measuring membrane.

However, and according to a preferred feature of the present invention, the pressure sensing device comprises two pressure orifices linked to two identical measuring circuits connected symmetrically on either side of the measuring cavity containing the measuring membrane so as to form a differential pressure sensor.

It shall be noted that in such a differential pressure sensor, the outlet channel must comprise two branches so as to directly link to the atmosphere both sides of the measuring membrane and to continuously balance the overpressures so as not to create any permanent imbalance of the measurements.

In the light of the above, the differential pressure sensing device being the object of the present invention enables a whole series of requirements to be complied with insofar as:
  it is particularly sensitive and enables pressure variations in the order of one mbar to be detected,
  it is flame-proof,
  its sensitive part is not in contact with the fluid to be measured so as to avoid any corrosion problems,
  it comprises an acoustic filtering stage and is consequently insensitive to the interference phenomena of the frequencies generated,
  the measurement of the differential pressure is automatically balanced.

The features of the pressure sensing device that is the object of the present invention will be described in greater detail with reference, but without limitation, to the appended drawings in which:

FIG. 1 is a diagram representing such a device equipping, as an example, a flowmeter of fluidic oscillator type adapted to measuring a gas flow, FIG. 1a represents a cavity of a device similar to the one represented in FIG. 1 but adapted to measuring a flow of incompressible liquid, FIG. 2 is an exploded perspective view of an example of one embodiment of a fluidic oscillator equipped with a device conforming to the present invention.

The enclosure I of the oscillator in which the fluid to be measured flows is schematically represented in FIG. 1.

According to FIG. 1, the pressure sensing device essentially comprises a measuring membrane 1 fixed into a measuring cavity 2 and two pressure orifices 3, 3' located in the internal part of the enclosure I and respectively linked to a measuring circuit 4, 4' so as to send on either side of the membrane 1 audible signals representative of the variations in the pressure to be measured.

These two measuring circuits 4, 4' are strictly identical and mounted symmetrically on either side of the measuring membrane 1.

One of these circuits 4 is represented in bold lines while the other 4' is represented in thinner lines.

For the sake of simplicity, only the circuit 4 will be described in the rest of this description.

The measuring circuit 4' contains elements x' identical to the corresponding elements x of the measuring circuit 4.

According to FIG. 1, the measuring membrane 1 is an elastically deformable membrane made of silicon.

A set of wheatstone-bridge mounted electrical resistances 5 schematically shown is etched on one of its faces and linked to an electric current supply circuit.

At least one of these resistances is sensitive to the deformations of the measuring membrane 1.

The audible signals taken at the pressure orifice 3 in the enclosure I are applied to the measuring membrane 1, on the side of this membrane not equipped with resistances 5, after passing via the measuring circuit 4.

Downstream from the pressure orifice 3, this circuit 4 is equipped with corrosion- and explosion-proof protection means and filtering means mounted in series that will be described in greater detail in the rest of this description.

Under the effect of the audible signals thus applied thereto, the measuring membrane 1 undergoes mechanical deformations.

These deformations are converted into electric signals representative of the audible signals at the Wheatstone bridge 5.

These electric signals are then sent to an electronic amplifier 20 associated therewith.

An electronic signal processing circuit 21 comprising an autocorrelation filtering enables the desired information to be obtained.

According to FIG. 1, the measuring circuit 4 comprises a duct 6 extending the pressure orifice 3.

This duct 6, which is short in length and small in diameter so as not to interfere with the audible signals taken at the pressure orifice 3, opens into a narrow protective cavity 7 of cylindrical shape in which a very thin protective membrane 8 is blocked.

This membrane 8 is produced so that it also enables the audible signals to be sent, without any substantial attenuation, from the duct 6 to a flame-proof protective tube 9 of low dimensions mounted downstream therefrom in the direction in which the audible signals $9_i$ propagate.

This protective tube has multiple functions the first of which consists in enabling audible signals to be transferred to the measuring membrane 1.

In parallel, the protective tube 9 serves as an explosion-proof and flame arresting barrier.

Moreover, it comprises a by-pass $9_2$ constituting an element of a first filtering stage for filtering the audible signals so as to remove the disturbance frequencies therefrom.

The by-pass $9_2$ of the protective tube is indeed a hydraulic resistor and is associated, in the direction in which the audible signals propagate, with a cavity 10 serving as a resonating chamber connected downstream therefrom.

The association of the tube $9_2$ and of the cavity 10 constitutes a Helmholtz-type resonator corresponding to a resonant acoustic system capable of amplifying certain frequencies and of enabling the audible signals sent thereto to be efficiently filtered.

According to FIG. 1, to improve this filtering and to ensure that the measuring circuit 4 only sends the measuring membrane 1 the fundamental components of the signals taken by removing the harmonics, a second filtering stage consisting of a second Helmholtz-type resonator mounted in series downstream from the first one is added to the Helmholtz-type resonator $9_2$, 10.

This second Helmholtz-type oscillator also consists of the association of a tube of low dimension 11 constituting a hydraulic resistor and of a second cavity 12 used as a resonator connected downstream from this tube 11 in the direction in which the audible signals propagate.

A secondary filter is thus obtained that only allows most of the fundamental frequency of the audible signals taken to pass.

According to FIG. 1, in the case of compressible gases, an adjustable piston $10_i$, $12_i$ enables the volume of the cavities 10, 12 to be varied and consequently the natural resonant frequency of the Helmholtz-type resonators thus constituted to be set.

According to FIG. 1*a*, in the case of incompressible liquids, the cavities $10_2$, $12_2$ are made up of elastic bellows adjustable by means of adjusting screws $10_3$, $12_3$.

According to FIG. 1, the second Helmholtz-type oscillator 11, 12 is linked to the measuring cavity 2 by another tube 13 also corresponding to a hydraulic resistor and consequently constituting an element of a third filtering stage consisting of the association thereof with the measuring cavity 2.

The assembly consisting of the tube 13 and the measuring cavity 2 is indeed a third Helmholtz-type filter, enabling a quasi third filtering to be obtained of the audible signals coming from the enclosure I that are taken at the pressure orifice 3 and sent to the measuring membrane 1 by passing via the measuring circuit 4.

It shall be noted that the dimensions of the tubes 9, 11, 13 and of the cavities 10, 12, 2 are very small; the volumes of the cavities are indeed less than ½ cm³ while the length of the tubes is less than 10 mm and their diameter less than 1 mm.

The natural frequencies of the three Helmholtz-type filters are adjusted so that their combination gives a bandwidth for all the wanted signals generated by the cavity of the fluidic oscillator.

Furthermore, the final autocorrelation filtering is itself adjusted to allow this frequency band to pass to remove the background noise preceding the final amplification before digital processing.

According to FIG. 1, the measuring cavity 2 is further linked to the external environment, on either side of the measuring membrane 1, at the cavity 10, by an outlet channel 14 of very low section, for example of 0.1 mm².

This outlet channel 14 is equipped with a selective membrane 15 known per se and having the particular feature of allowing air to pass but of preventing water molecules from passing.

According to FIG. 2, the fluidic oscillator consists of a bronze element in several parts linked to each other by means of screws 16.

The fluid to be measured enters this oscillator along the arrow A and leaves it along the arrow B after passing via the enclosure I.

A very small fraction of this fluid is taken by the pressure orifices 3, 3' to be transferred into the pressure sensing device the different elements of which are designated by the same references as in FIG. 1.

Seals 17 enable tightness to be ensured throughout the entire propagation trajectory of the audible signals in the measuring circuit, between the orifices 3, 3' and the measuring cavity 2 containing the measuring membrane 1, by passing through the protective cavity 7, 7' containing the protective membrane 8 and the Helmholtz-type oscillators 9, 10; 11, 12 and 9', 10'; 11' 12'.

The invention claimed is:

1. A pressure sensing device adapted to corrosive or explosive atmospheres and particularly intended to equip a vapor or liquid flowmeter of static fluidic oscillator type, this device comprising:

a pressure orifice linked to a measuring circuit so as to send audible signals representative of the variations in the pressure to be measured to a measuring membrane fixed into a measuring cavity and deforming under the effect of the audible signals applied thereto;

a deformation sensor sensitive to these mechanical deformations and converting them into electric signals; and electronic processing units for electronically processing the electric signals associated with this deformation sensor, characterized in that the measuring circuit comprises:

firstly, corrosion- and explosion-proof protection means comprising:

a very thin corrosion-proof protective membrane which is slightly elastically deformable, made of a very resistant material and blocked in a protective cavity dimensioned in such a way as to limit its displacement; and at least one explosion-proof protective tube mounted downstream from the protective membrane in the direction in which the electric signals propagate, designed so as to avoid any flame propagation and used as a hydraulic resistance; and secondly, filtering means for filtering the audible signals comprising at least one Helmholtz-type resonator consisting of the association of a by-pass of the protective tube and of a cavity used as a resonating chamber and dimensioned in such a way as to enable the disturbance frequencies to be removed from the audible signals before they are applied to the measuring membrane.

2. Device according to claim 1, characterized in that the means for filtering the audible signals comprise at least two Helmholtz-type resonators mounted successively on the measuring circuit and designed so as to have different natural resonant frequencies.

3. Device according to claim 1, characterized in that the measuring cavity is linked to the Helmholtz-type resonator or to one of them by a measuring channel so as to define therewith an additional Helmholtz-type resonator.

4. Device according to claim 1, characterized in that the natural frequencies of the Helmholtz-type resonators are adjusted so as to obtain downstream a bandwidth for all the wanted audible signals.

5. Device according to claim 1, characterized in that the measuring membrane consists of an elastically deformable membrane, preferably made of silicon, on a face of which electrical resistances are etched, preferably Wheatstone-bridge mounted, and at least one of which is sensitive to the deformations of the membrane, these electrical resistances constituting the pressure sensing.

6. Device according to claim 1, characterized in that the measuring cavity is linked to the external environment by an outlet channel of low section preferably closed by a damp-proof membrane.

7. Device according to claim 1, characterized in that it comprises two pressure orifices linked to two identical measuring circuits connected symmetrically on either side of the measuring cavity containing the measuring membrane so as to form a differential pressure sensor.

* * * * *